United States Patent [19]
Demko et al.

[11] Patent Number: 5,509,462
[45] Date of Patent: Apr. 23, 1996

[54] GROUND SOURCE COOLING SYSTEM

[75] Inventors: Michael Demko, Houston; David Blumentritt; Robin Zapalac, both of Pearland, all of Tex.

[73] Assignee: Ground Air, Inc., Houston, Tex.

[21] Appl. No.: 243,573

[22] Filed: May 16, 1994

[51] Int. Cl.$^6$ ............................. F28D 7/12; F25D 23/12
[52] U.S. Cl. .............................. 165/45; 165/155; 62/260
[58] Field of Search ........................... 165/45, 154, 155; 62/260; 60/641.2

[56] References Cited

U.S. PATENT DOCUMENTS

| | | | |
|---|---|---|---|
| 3,648,767 | 3/1972 | Balch | 165/104.19 |
| 3,965,694 | 6/1976 | Vignal et al. | 62/260 |
| 4,042,012 | 8/1977 | Perry et al. | 165/1 |
| 4,091,636 | 5/1978 | Margen | 62/238 |
| 4,255,936 | 3/1981 | Cochran | 62/238.7 |
| 4,325,228 | 4/1982 | Wolf | 62/260 |
| 4,392,531 | 7/1983 | Ippolito | 165/45 X |
| 4,556,101 | 12/1985 | Haldeman | 165/45 |
| 4,570,452 | 2/1986 | Bingham | 62/260 |
| 4,644,750 | 2/1987 | Lockett et al. | 60/641.2 |
| 4,671,351 | 6/1987 | Rappe | 165/45 X |
| 4,993,483 | 2/1991 | Harris | 165/45 |

FOREIGN PATENT DOCUMENTS

| | | | |
|---|---|---|---|
| 43137 | 3/1982 | Japan | 62/260 |
| 207752 | 12/1982 | Japan | 165/45 |

*Primary Examiner*—Leonard R. Leo

[57] ABSTRACT

The present invention relates to one or more ground tubes connected and channelized to provide a counter-flow heat exchanger with an annular space to permit water injection into the subsurface water table.

17 Claims, 8 Drawing Sheets

GROUND SOURCE COOLING SYSTEM

BACKGROUND OF THE INVENTION

1. Field of the Invention

The present invention relates to a system for ground source cooling for refrigerant coolants. In particular, coolant for a refrigeration unit for a refrigerator or air conditioning unit is heated and requires an economical and effective cooling application. An appreciation of this need can be understood by review of a ground system's effects on air conditioning systems.

In air conditioning systems for residential use, a reversed cycle technique system is applied. A reversed cycle system receives heat from a colder body and delivers heat to a hotter body by virtue of a work input such as a compressor.

The reversed cycle is well-known through its uses in preserving foods, as well as conditioning air for summer and winter comfort. In a technical sense, a heat pump is a general name for all reversed cycles. A reversed cycle, as applied to a typical air conditioning application is the most common method of securing refrigeration. Heat is rejected at the higher temperature and added at the lower temperature The net work is:

$$W = Wont - Win = \int DQ = QA - |QR|.$$

a negative number that indicates work is done on the system. The system is the circulating working substance, such as R-22 refrigerant, although the present invention is not limited to any one particular refrigerant as the present invention will work with all refrigerants. In the ideal case, all flow is without friction, except flow through the expansion valve, and all processes except those in the condenser and evaporator are adiabatic. In a reversed cycle, such as residential air condition or heat pumps, the state point conventionally moves in a counterclockwise sense on the TS plane, where T is temperature and S is total entropy.

In a simplified refrigeration cycle, starting at State 1, an isentropic compression brings temperature higher than the source temperature to T1 by an amount equal to ΔT, so that heat can be rejected along an isothermal curve A. An isotropic expansion lowers the temperature to where heat may be added to the system reversibly from a cold room at T2+ΔT. The refrigeration is represented by QA, and the net work to provide a set value of refrigeration for the system is depicted by W.

For a given temperature range and a particular isothermal curve A, the work must necessarily be the same as the equivalent power cycle, the heat rejected by the reversed cycle at the higher temperature must be equal to the heat added in the power cycle, and so on. The parameter used to indicate the efficiency of a reversed cycle is called the coefficient of performance, abbreviated COP and represented by the symbol γ. For a reversed cycle used for cooling, the COP is stated as:

$$\gamma = \frac{\text{refrigeration}}{\text{network}} = \frac{QA}{|W|} = \frac{T1}{T2 - T1}$$

These values of the COP are the highest possible for all cycles operating between the temperatures T1 and T2. It is clear that the work W to activate and maintain the refrigeration cycle should be a minimum, since it must be manufactured and paid for. The basic tenets of this simple fact, which are the basis for modern thermodynamics are stated as follows:

1) The work REQUIRED will be reduced as the temperature T1 is lowered for refrigeration and T2 is raised for heating. In a refrigerating cycle, the lowest temperature T0 that is attainable by a natural coolant, such as the atmosphere, a lake, or an underground water table, is the most economical. In a heating cycle, the highest temperature T0 that is attainable by a natural coolant, such as the atmosphere, a lake, or an underground water table, is the most economical. In a refrigeration cycle, there is a natural lower limit for T1 set by T0. Likewise, there is an upper limit for T2 set by T0 for a heating cycle. In practice, T1 for refrigeration and T2 for heating is some 5° to 20° F. greater than T0. In a warming cycle, T2 must be some 10°–20° F. or more above the room temperature. Thus, if it is desired to keep a room at 70° F., the refrigerant must stay at 90° F. or more. Smaller temperature differences than mentioned could be used, but as the temperature difference decreases, the surface area needed in the heat exchanger increases in order to maintain the same rate of heat flow, thereby increasing the cost of the heat exchanger. In practice, it is a matter of getting an economical balance. For heating, the presence of relatively warm earth or ground water is very helpful. The earth or ground water provides natural sources of heat at temperatures higher than winter atmospheric temperatures. Likewise, for cooling, the presence of relatively cool earth or ground water is very helpful. The earth or ground water provides natural sources of cooling at temperatures lower than summer atmospheric temperatures. In a particular geographic location, we would tend to use the coldest convenient sink for cooling and the warmest convenient sink for heating.

2) For particular temperature limits, the heat exchanger should take place at constant temperature for the most effective use of the work. In the case of vapor refrigerants, the refrigerant will be at a constant temperature during much of the heat transfer process.

2. Description of the Prior Art

Many air conditioning systems use water-cooled condensers. An evaporative condenser may be used to cool the condenser vapor. In this system, a conventional motor compressor, condenser, liquid receiver, drier, thermostatic expansion valve, and evaporator are used. The hot compressed refrigerant vapor is piped to the evaporative condenser. This part of the system is usually located on the roof or outside the building. In this mechanism, the water supply is piped to a holding tank. A float mechanism maintains a constant level of water in the tank. A water pump circulates and sprays water over the refrigeration condenser. A fan draws in air through the side of the evaporative condenser housing and forces it upward through the top. The water droplets are cooled by evaporation and then flow over the condenser. Some water is used up by the evaporative process. This is automatically replaced using a holding tank and a float mechanism. A pressure motor control is used on the refrigeration motor compressor in this instance.

Deficiencies in the evaporative condenser are the work required to drive the pump and fan, corrosion and scaling of heat exchanger equipment, cost and space requirements.

Many refrigeration and air conditioning systems have water-cooled condensers where tap water is circulated through them. Other applications use underground water. This water is then discharged into the sewer or a drainage ditch. Such an arrangement uses large amounts of water and is expensive and wasteful. Moreover, many places do not allow the use of tap water for cooling air conditioner condensers.

A cooling tower is another application of a water-cooled condenser. The cooled water is recirculated through the condenser and sometimes through the outer shell of the compressor. Some makeup water will be required to replace the water lost by evaporation. The cooling tower is a housing or shed into which air is drawn. It has a water spray arrangement and baffles. The sprayed water is exposed to the stream of air and becomes cool. A float mechanism connected to the water spray maintains a constant water level in the water reserve tank. The pump circulates the cooled water through the water-cooled refrigerant condenser.

Water is sometimes sprayed over the baffles. Cooling towers are available in a great range of sizes. Small ones may cool the water cooled condensers for home air conditioners.

Deficiencies in the cooling tower are the cost required to drive the pump and fan, corrosion and scaling of heat exchanger tubing, cost, and space requirements.

A water source heat pump uses a water-to-refrigerant heat exchanger to extract heat from a heat source. In residential settings, the source can be ground water, river or lake water, city water, stored solar energy, or the ground itself. In principle, water-source heat pumps have an efficiency advantage over air-source systems because of heat source temperature constancy. The annual range of variation in ground water or surface water temperatures in most parts of the country is much less than the variation in air temperature. In describing water-source heat pumps, it is important to distinguish between the equipment and the system in which the equipment is applied. Water-source heat pump equipment is either of the water-to-air or water-to-water type and is available in single package units or split systems that can be designed to accommodate a wide range of building types and heat sources. About 16 manufacturers make water-source heat pump equipment. A water source heat pump system can be either open-loop or closed-loop. Open-loop systems use ground water or surface water directly; water is pumped from the well, river, or lake through the water-to-refrigerant heat exchanger and, eventually, either returned to the source or pumped to a drainage basin, pond, or storm sewer. Closed-loop systems continuously circulate a heat transfer fluid, such as water or a water-antifreeze mixture, to extract heat from the ground or surface water source (and reject heat thereto). Water-source heat pump systems are most often classified according to the heat source utilized, the principal difference among these systems is the method employed for source-to-refrigerant heat exchange.

Ground water is available in most parts of the United States and many homes in rural areas have wells that tap into ground water. As mean ground water temperature maps show, the ground water, even in northern climates remains relatively moderate. Ground water heat pump systems are of the open-loop type. Water is withdrawn from a well, flows through the heat exchanger of the heat pump, where it exchanges heat with the refrigerant, and is then disposed of by reinjection or discharged. Single and multiple well systems are available. Deficiencies in the ground water heat pump systems are the regulations associated with removing and reinjecting ground water, the cost associated with drilling the well and pumping the water, and inefficient heat exchange between the water source and the refrigerant.

Ground-coupled heat pumps use the earth itself as a heat source and heat sink. The heat pump is coupled to the earth by means of a closed-loop heat exchanger, or ground coil, is usually either synthetic or copper piping and may be installed horizontally or vertically in the ground. The ground-coupled heat pump circulates water from the heat pump through the ground coil to absorb or reject heat. Apart from the heat exchanger configuration, ground-coupled heat pumps function similarly to open-loop water-source heat pumps. The closed-loop configuration eliminates the need for the great quantities of water demanded by open-loop water-source heat pumps. Also, water disposal is not required, thereby avoiding the need for a reinjection well. Ground-coupled heat pumps may apply to a wide range of homes, especially those with adequate space to install horizontal heat exchanger piping. Vertical heat exchanger systems are the only option for homes with small yards.

At present, all ground-coupled heat pumps use commercially available water-to-air equipment. Two basic configurations are used: the pressurized or closed-fluid system, and the atmospheric or open-fluid system. (This is not to be confused with the fact that a ground-coupled system is a closed-loop system, which means that the heat exchanger fluid recirculates within the heat pump and does not leave the system.) In what is termed an atmospheric system, the transfer fluid is exposed to atmospheric pressure, thus atmospheric systems typically require larger pumps to accommodate pressure head differences. Pressurized systems, whose transfer fluids are not exposed to atmospheric pressure, require smaller circulation pumps and, as a result, have lower operating costs. Pumping power may account for 10 to 12% of total electrical consumption in an atmospheric system, and 4 to 5% in a pressurized system. Consequently, the performance of the atmospheric system will be somewhat lower than that of the pressurized system. (Atmospheric or pressurized classification may be applied to all water-source heat pump systems. The most common ground-coupled heat exchangers are horizontal serpentine, vertical U-tube, and vertical U-tube in multiple shallow wells. Some concentric tube designs have been experimented with, but are uncommon. Heat exchangers are installed either horizontally or in a vertical well hole, and typically are constructed on-site.

The efficiency of the common air-to-air heat pump depends greatly on outdoor temperature. To improve this efficiency, some installations use a coil buried in the ground beneath the frost level, rather than a coil in the atmosphere. If the coil is buried at some depth and a long enough coil is used, the efficiency of the heat pump may be very good.

On the heating cycle, liquid refrigerant flows though a refrigerant control and into the ground coil. Since the refrigerant in the ground coil is under low pressure, it boils, absorbing heat from the ground surrounding the coil. The vaporized refrigerant is then drawn into the compressor. It is compressed and discharged into the condenser, which, in this case, is the heating coil for the heating system. The condenser changes the vaporized refrigerant to a liquid. The refrigerant gives up its heat to the room air. The liquid refrigerant returns to the refrigerant control to repeat the cycle.

The same mechanism is used to cool in summer. The cycle is reversed to move heat from the building to the outdoors. In this case, the inside coil serves as the evaporator and the ground coil becomes the condenser. The ground absorbs the heat from the vaporized refrigerant. Heat pump installations using ground sources are even more efficient if the ground coil is placed in a spring or in a flowing well with water at about 50° F. Some heat pump installations have been successful using a coil placed in the bottom of a lake.

Although designs have been devised in which the heat pump's refrigerant is pumped through a direct refrigerant expansion coil buried in the ground, the current state of technology has led heat pump manufacturers to recommend not using this technique. Considerations include cost due to two factors: necessary custom design of the heat exchanger, and use of copper as the coil material. The heat exchanger must be custom-designed by a refrigeration engineer to ensure the oil return rate to the compressor is adequate and occurs under all operating conditions. Additionally, cost is a consideration, due to the fact that in most installations, the air condensing unit is completely replaced with a buried coil. This leads to high installation expenses. Copper's durability makes it the only heat exchanger material that can be used. Horizontal burial is preferred if a DX coil is used because of oil return problems. The advantage of using the heat pump refrigerant as the heat exchanger working fluid is that it eliminates the temperature drop that typically occurs between the refrigerant and the heat exchanger fluid. The performance of the DX ground-coupled heat pump may be 20% higher than that of systems using other heat exchanger fluids.

The present invention relates in general to a method and apparatus for augmenting exiting refrigeration systems to provide refrigerant liquid line subcooling by using ground source cooling.

SUMMARY OF THE INVENTION

Accordingly, it is an object of this invention to provide a ground source cooling system for heated coolants that avoids the drawbacks of the aforementioned prior art proposals by providing one or more ground tubes or hollow concentric metal tubes connected and channelized to provide a counter-flow heat exchanger with an annular space to permit water injection into the subsurface water table.

It is a further object of the present invention to provide various alternative arrangements and design configurations of at least one or more ground tubes and to determine the appropriate configurations for installation of said at least one ground tube to achieve maximum efficiency and minimal cost for cooling the heat coolants in an economical and ecologically effective way. In addition, the present invention provides a means for effectively heating or cooling air or water by use of ground tube configurations in series, in parallel or in combined series/parallel configurations for such applications.

Other objects will become clear from the foregoing drawings and specification.

DETAILED DESCRIPTION OF THE PREFERRED EMBODIMENTS

Figure 1:
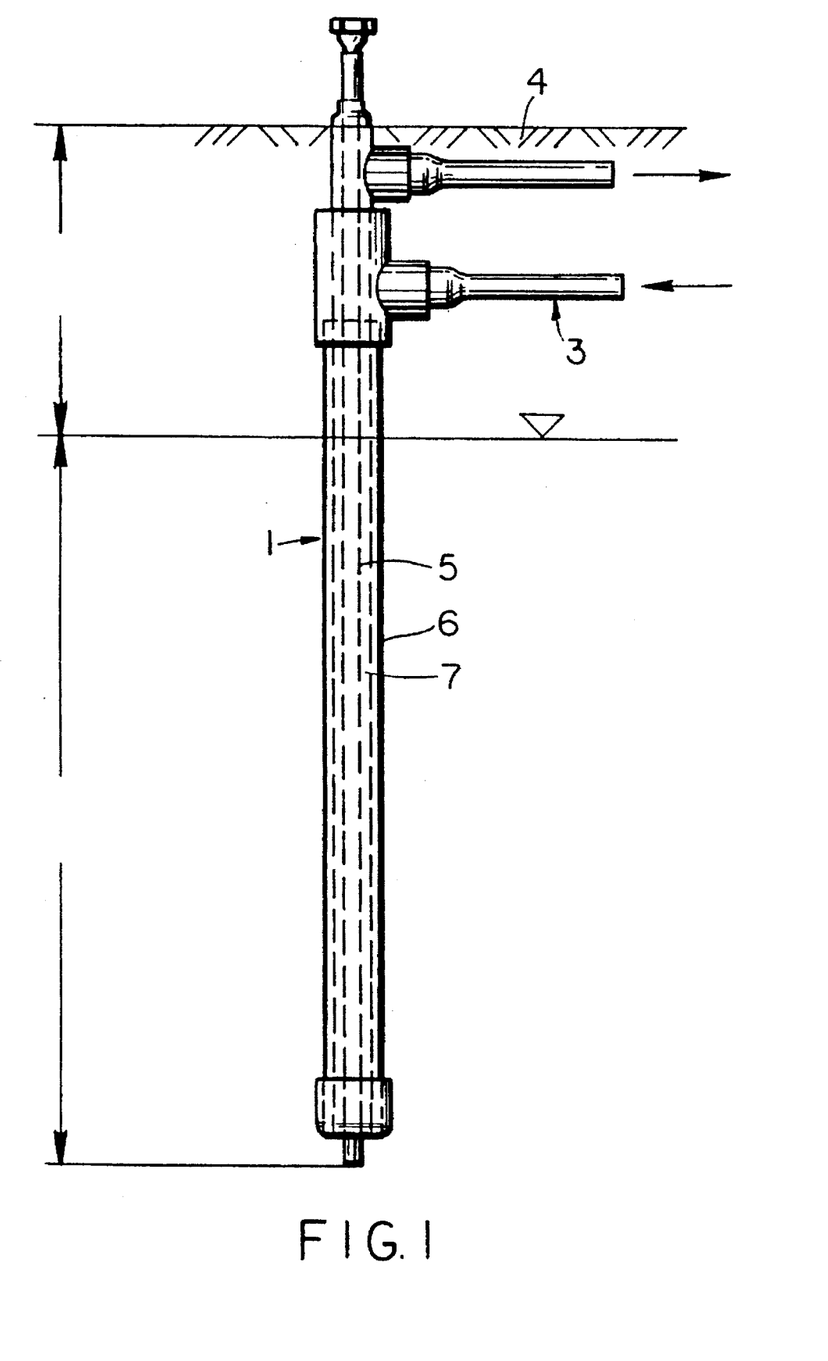
FIG. 1 is a sectional side view of a first embodiment of the present invention.

For a fuller understanding of the present invention reference is made to the drawings in which FIG. 1 shows a first embodiment of the present invention. As shown in FIG. 1, a ground tube 1 was inserted into the soil 2 in an outside environment. The ground tube 1 has a refrigerant supply inlet 3 and a refrigerant supply outlet 4 which are connected, preferably by tubing, to a compressor and an evaporator, respectively of a refrigeration unit such as a refrigerator unit or an air conditioning unit. Heated coolant from the refrigeration unit flows through the refrigerant supply inlet 3 and into the ground tube 1 when the heated coolant is cooled by means of heat exchange with the surrounding soil, the coolant flows out of the ground tube 1 through the refrigerant supply outlet 4 and back into the evaporator or expansion device (e.g. expansion valve, capillary tube) of the refrigeration unit.

As shown in the embodiments of FIG. 1, the ground tube is formed as a closed pipe casing with two inner channels 6, 7 for refrigeration flow and an inner pipe 5 for water injection. Heat transfer between the circulating fluid (coolant), as it flows down the annular space, and the surrounding soil or earth is the useful heat transfer.

As the fluid (coolant) returns up the inner annular space, 7 it experiences heat gain due to heat flow across the inner pipe wall from the outer annular space, 6. Crossover heat flow results in some degradation in the heat exchange process. However, the reduction in manufacturing and installation costs versus optimum technical solution is a trade off. This detrimental effect is minimalized by practical low design values for the proper sizing of the annular spaces, 6 and 7.

Figure 4:
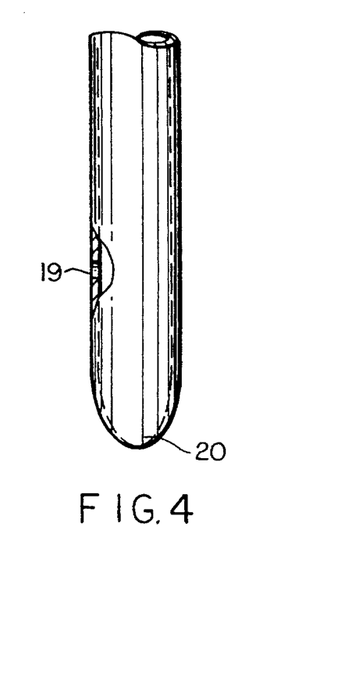
FIG. 4 is a side view of FIG. 3.

The ground tube 1 is preferably formed as a triple connection tube as best shown in FIG. 4. The ground tube 1 has a water injection channel 5 which is the channel through which high pressure water is driven to drill the injection well and thus sinks the ground tube 1 into the soil. The ground tube 1 also has a second tube 6 immediately encircling and enclosing said water channel 5 which is a return inlet channel 6 and a third and outermost tube surrounding said second tube 6 that provides a supply coolant channel 7. This triple concentric ground tube 1 is preferably made of copper for its thermal conductive properties in providing for an effective heat exchange with the surrounding soil, as well as durability.

Figure 2:
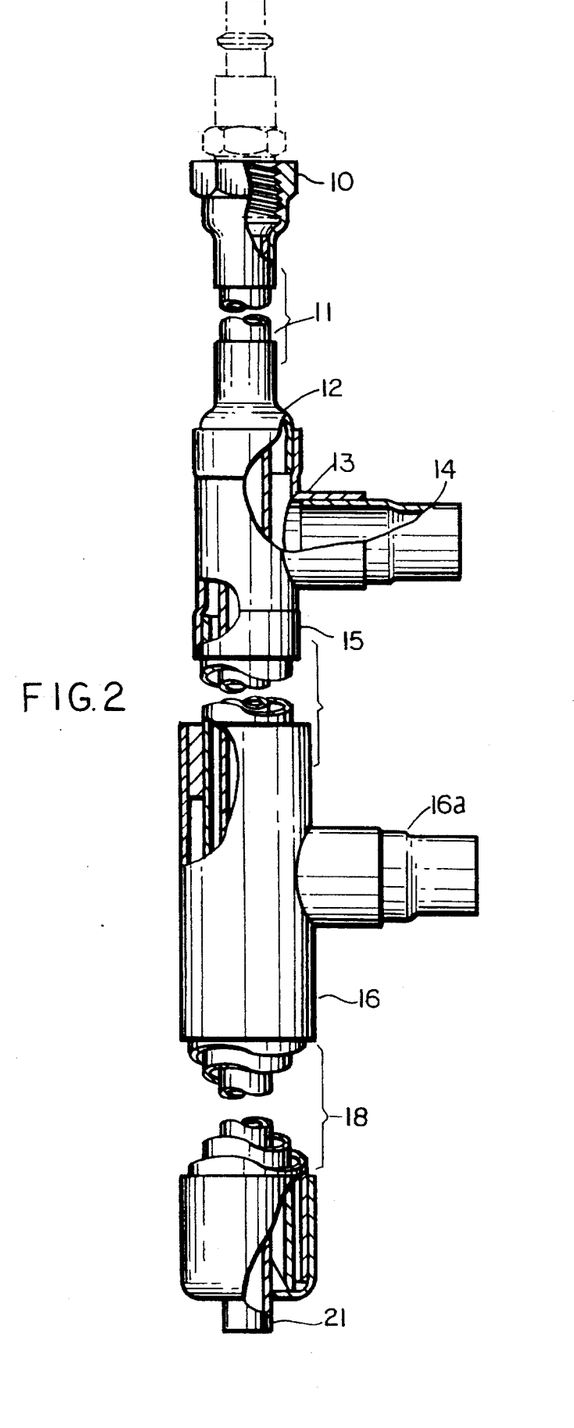
FIG. 2 is an exploded perspective view of the first embodiment shown in FIG. 1.
Figure 3:
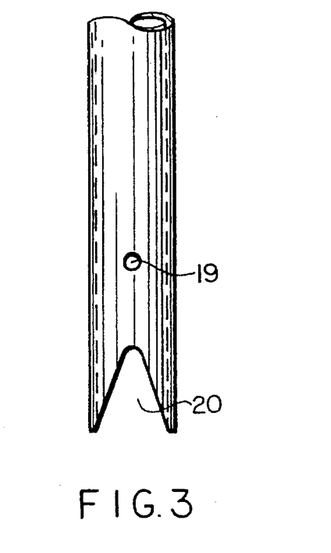
FIG. 3 is a frontal view of the inner tube of FIG. 2.

The ground tube 1 as shown in FIG. 2 includes: a water injection quick disconnect filling 10, the water injection channel or line 11, a refrigerant return/water injection line transition reducer 12, a refrigerant return "T" 13, a refrigerant return reducer 14 (coupled to the refrigerant return line 14), a refrigerant return/supply transition reducer 15, a refrigerant supply "T" 16, a refrigerant supply/heat exchanger reducer 16a (coupled to the refrigerant supply line 3), a refrigerant supply/heat exchanger, a reducer, a refrigerant supply/heat exchange 18 (only partially shown), an oil aspirator safety orifice 19, a refrigerant supply/return transition structure 20, and a water injection terminator 21.

Figure 5:
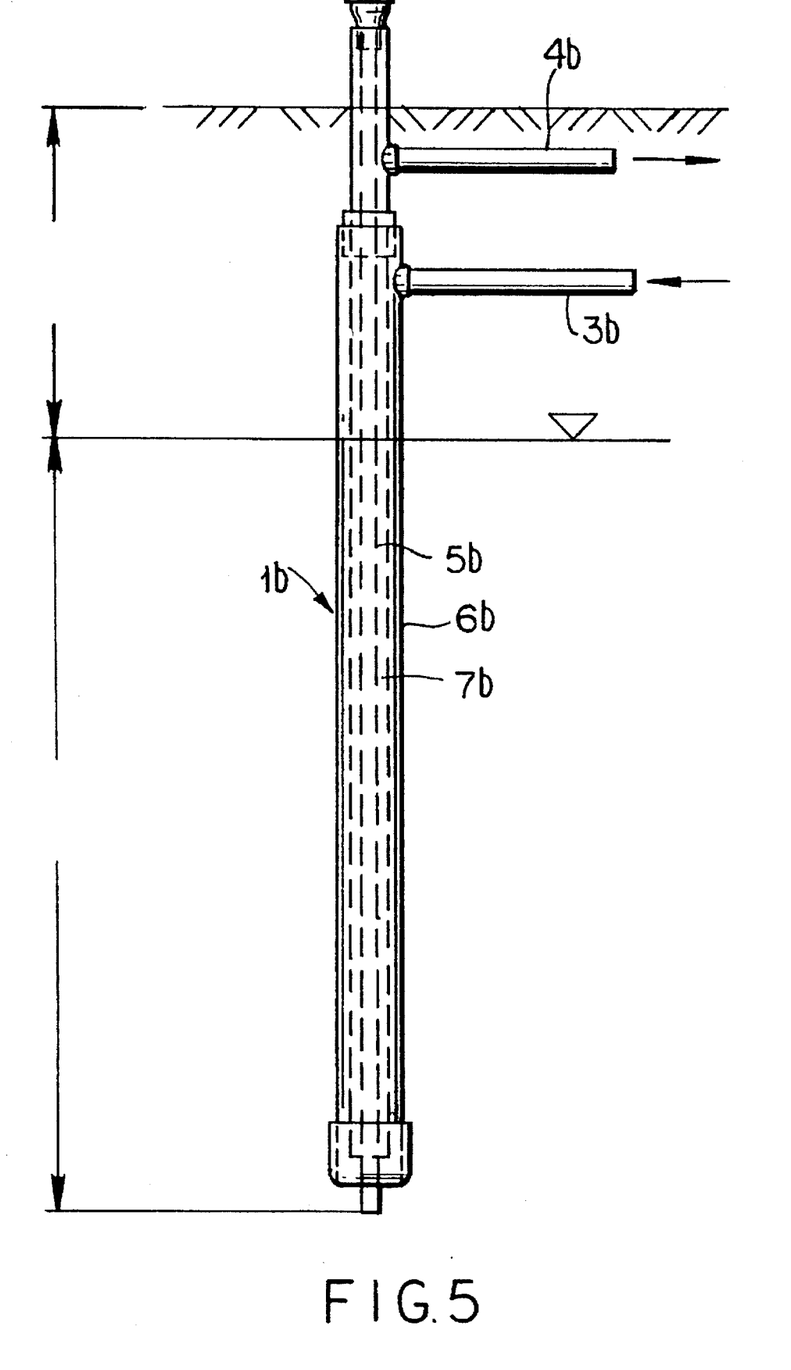
FIG. 5 is a sectional side view of a second embodiment of the present invention.
Figure 6:
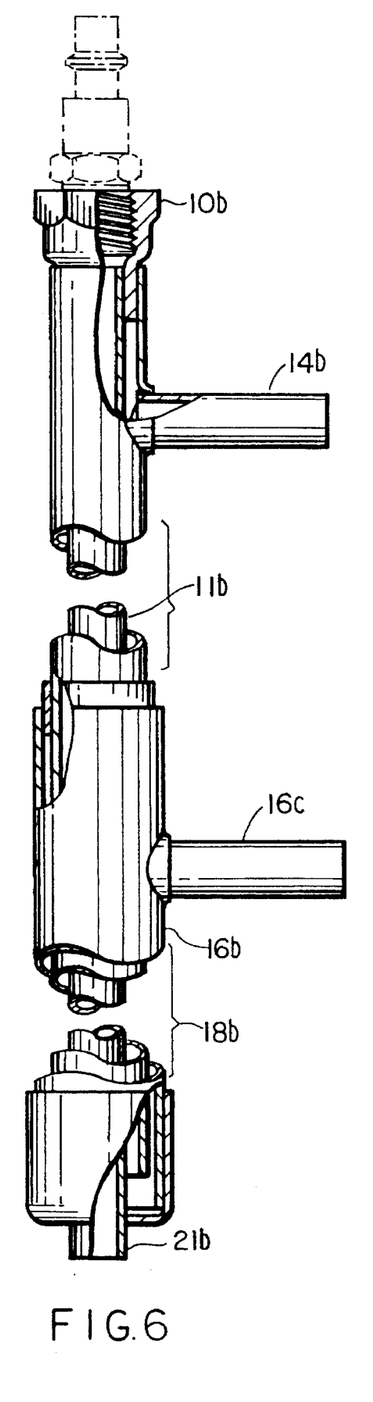
FIG. 6 is an exploded perspective view of the second embodiment shown in FIG. 5.

In FIG. 5, a variation or alternate embodiment to FIG. 1 is shown where instead of the same fittings in FIG. 1, the T's have been replaced. Corresponding elements have been followed with the letter "b" such as elements 5b, 6b, 7b, etc. for elements 5, 6 and 7 in FIG. 1 respectively. Similarly, element numbers for FIG. 6 correspond with respect to the elements in FIG. 2 except element 16c in FIG. 6 corresponds to element 16a in FIG. 2.

As shown in FIGS. 7, 8, 9 and 10, there are four different embodiments for the lower section of the ground tube 1 design of FIGS. 1 and 5. FIGS. 1 and 5 are drawn with the preferred embodiment of the triple coaxial tube arrangement of FIG. 7.

In an air conditioning application, the refrigerant supply channel is the channel coming from the existing condenser. The refrigerant return channel, in the air conditioning application, is the channel that the ground-cooled refrigerant returns to the existing system and enters the tubing leading to the expansion device (e.g. expansion valve, capillary tube, etc.). The water injection channel is the channel through which high pressure water is driven to drill the injection well. This channel is attached to the outside of the Type B tube (described below) and is not present in FIG. 10, a variation of FIG. 8 (also described below).

Figure 8:
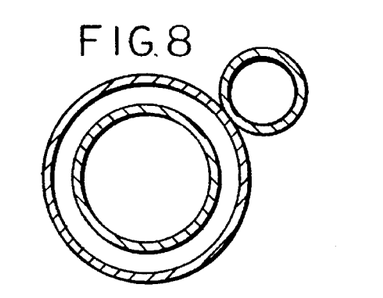
FIG. 8 is a bottom view of a alternate embodiment of FIGS. 2 and 6 of the present invention.

As shown in FIG. 8, the water injection channel is spot soldered to the outside of the refrigerant supply channel tubing for this ground tube embodiment. Spot soldering is used to prevent unnecessary annealing of the tubing. Support bands or tape are used to provide additional reinforcement during the injection process. This apparatus remains attached during operation and provides additional surface area for heat dissipation.

Figure 7:
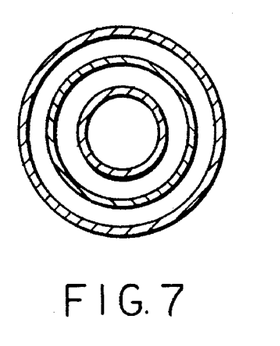
FIG. 7 is a bottom view for the first and second said embodiments of FIGS. 2 and 6 of the present invention.
Figure 9:
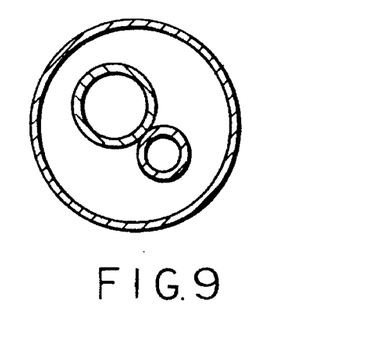
FIG. 9 is a bottom view of still another alternate embodiment of FIGS. 2 and 6 of the present invention.

FIG. 9 shows another embodiment with an integral water injection channel and a refrigerant return channel, but one which differs from the ground in FIG. 7 in that the water injection channel is attached to the outside of the refrigerant return channel, and the two channels are encircled by the supply refrigerant channel.

Figure 10:
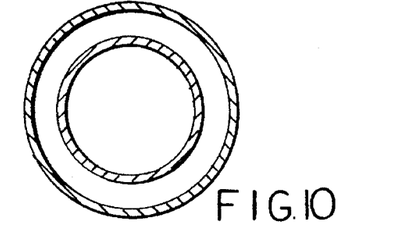
FIG. 10 is a bottom view showing an alternate embodiment of FIG. 8.

FIG. 10 shows another embodiment with no refrigerant supply channel and integral return channel, but one which differs from the ground tube in FIG. 7 in that no water injection channel is present.

Ground tube or a concentric air conditioner in-line ground source condensing subcooler (Type A) is constructed of "L" copper pipe, nominally has internal diameters of ⅞", ⅝", and ⅜" respectively, and external wall thicknesses of 0.045", 0.035" and 0.032" respectively, is inserted in the ground, where the ambient temperature averages 72° F. These are preferred dimensions for residential A/C. Other sizes may be preferred for refrigeration or other applications.

Material selection is principally hard drawn, "K" or "L" thickness, air conditioning and refrigeration (ACR) copper tubing to maintain low resistance to refrigerant flow, ensures resistance to corrosion, and to simplify installation. "L" thickness soft copper tubing is used on the surface to provide for connection of the ground tube to the existing air conditioner's liquid line. Available sizes which may be used for construction of the ground tube are well known in those skilled in the art. Early production models used fittings primarily to construct the ground tube. To minimize costs, new production methods are eliminating most fittings and using other manufacturing processes to join components.

The preferred dimensions for the various embodiments are set forth in the Table below, where tubes X, Y, Z represent respectively the water injection channel, refrigerant return channel and the refrigerant supply channel and ground tube types A, B and C, represent respectively the embodiments of FIGS. 7, 8 and 9.

| Ground Tube Type | Pipe Diameter (inch) | | | Pipe Thickness (inch) | | |
| --- | --- | --- | --- | --- | --- | --- |
|  | X | Y | Z | X | Y | Z |
| A | ⅜ | ⅝ | ⅞ | .03 | .04 | .045 |
| B1 | ⅜ | ⅝ | ⅞ | .03 | .04 | .045 |
| B2 | ⅜ | ½ | ⅞ | .03 | .035 | .045 |
| B3 | ⅜ | ½ | ¾ | .03 | .035 | .045 |
| A2 | ⅜ | ⅝ | 1⅛ | .03 | .04 | .05 |
| C1 | ⅜ | ½ | 1⅛ | .03 | .035 | .05 |

Solder for joining components of the ground tube use a Phosphorous-Copper Brazing containing 2–5% silver with a melting point of 1180°–1460° F. and shear strength of 8340 psi.

The generalized equation for heat flow is found by $$Q = \frac{\Delta t}{\Sigma R}$$

Where $\Delta t$ is the temperature differences across the applicable media, and R is the thermal resistivity, which is the reciprocal of the conductivity, k, the ground tube is considered, in thermodynamic terms, a curved wall. Since the area through which heat flows in a curved wall is not constant, the geometry of the tube is considered.

The equation for rate of heat transfer for a curved wall is:

$$Q = \frac{2\pi z k (t_a - t_b)}{\ln(r_o/r_i)} = \frac{2\pi z k \Delta t}{\ln(D_o/D_i)}$$

where ro is the outside radius of the pipe, ri is the inside radius, and ro/ri=Do/Di. The generalized form for this equation for any number of laminated cylinders, each with certain inside and outside diameters of Di and Do, with a conductivity of k, and z ft length, we have for a steady state:

$$Q = \frac{\Delta t}{\Sigma \frac{1}{Ah} + \Sigma \frac{\ln(D_o/D_r)}{2\pi z k}}$$

Where $\Sigma(1/Ah)$ is the sum of all film resistances in the path of heath flow, the other term in the denominator sums all other resistances, and the temperature difference is found by:

$$\Delta T = \frac{T_2 + T_1)}{2 - T_o},$$

the difference in average fluid temperature in the annular channels $$\frac{(T_2 + T_1)}{2},$$

and the earth temperature, To.

$T_2$ is fluid exit temperature, °F.

$T_1$ is fluid entry temperature, °F.

To is ground temperature, °F.

The heat is flowing radially only.

The conductance term U for heat flow from fluid in the heat exchanger to the earth can be estimated with the conductance coefficient for composite cylinders. The impedance to heat flow from the outer annular channel to the surrounding earth is caused by the thermal resistance of the pipe wall and the soil cylinder around the casing. Impedance to heat flow from the inner annular channel, as well as any build-up that occurs in the inner pipe, to the outer annular channel is caused by the thermal resistance of the inner pipe wall and the thermal resistance of the refrigerant in the inner annular channel. The soil resistance varies with the composition of the underground environment. Two primary states, or measures of soil resistance of the underground environment exist, the soil above the water table and the soil within the water table.

The thermal influence of the pipe walls which separate the two fluid streams affects the temperature change in the fluid passing the heat exchanger for given operating conditions, and it is manifest in the magnitude of the U-value. The casing wall resistance Rp can be calculated with sufficient accuracy from handbook values. The earth thermal resistance term Rx values can be calculated with sufficient accuracy from Geologic survey data and handbook values. Field testing is used to confirm analytical results and to qualify the Rs value under different operating conditions and heat exchanger designs. Pipe thermal characteristics are calculated according to methods known to those skilled in the art.

The thermal resistivity of the soil varies with the composition of the underground environment. The thermal resistivity of soil depends on the type of soil encountered as well as the physical condition of the soil. The conditions which most influence the resistivity of a specific soil are the moisture content and dry density. As the moisture content or dry density or both of a soil increases, the resistivity decreases. The structural composition of the soil also affects the resistivity. The shape of the soil particles determines the surface contact area between particles which affects the ability of the soil to conduct heat.

Another factor that must be considered is the phenomenon of moisture migration and possible soil thermal runaway, therefore, soil thermal stability must be considered. The moisture migration process begins when a temperature gradient is imposed across the soil. This temperature gradient will cause a water vapor pressure gradient to develop, resulting in moisture migration away from the heat source. If the soil is thermally stable, equilibrium is maintained by moisture moving back toward the ground tube due to capillary action. If unstable conditions exist, the moisture movement due to the vapor pressure gradient predominates, causing local drying of the soil near the ground tube. As the soil dries, the thermal resistivity of the soil increases resulting in more moisture migration away from the ground tube. The net result of this occurrence could cause the thermal resistance of the dried soil to approach that of a thermal insulator. It is for this reason that the environment of the ground tube is treated, as a minimum, as a two layer environment. That is the layer above the water table, where the probability of soil drying is higher, and the layer within the water table, where the probability of soil drying is lower.

The primary factor in estimating the ground tube heat transfer is the depth of the water table. Supporting geologic survey data indicate that L1, the distance from the surface to the water table is variable based on season and location. This condition is universal, and the information supplied for this area is treated as representative.

From a soil survey, there are 8 soil associations in this area. The soil associations are specified based on the first 5 feet below the surface. Current installations of ground tubes are in the Midland-Beaumont Association, specified as map symbol Bd. The soil type observed is a Beaumont series soil.

The 0 to 73 inch layers are treated as Plastic Clay, the layer from 73 to 180 inches as uniform sand, and the layer from 180 to 240+ inches as natural sand primarily due to its low density. The next major factor for consideration is the moisture content.

The U.S. Dept. of Agriculture Survey of Harris County indicates that the High Water Table ranges from a maximum of 0.0–2.0 ft. from November to March in many areas to a minimum of >6 ft. for certain areas where improper drilling practices resulted in a drastic lowering of the water tables. These areas have been charted and plan to be avoided. Little data is available on the ground water table level below 6 ft. However, based on surveys of well drilling logs and field installations, L1, is specified by U.S. Geological Survey data as 0–2 ft. perched from November to March and conservatively estimated as 8 ft for worst case summer operation. This is backed up based on removal of a ground tube installed 3 years ago in Northern Brazoria County. Inspection of the tube revealed a discoloration in the first eight feet due to clayey loam soil being "baked-on". Below the eight foot mark, no discoloration was observed, indicating the existence of a constant ground water table. Further, due to the shiny coloration of the copper, it is apparent that the ground water was flowing or "apparent", not captured or "perched".

Based on the conservative estimate, the soil thermal environment for a ground tube of length equal to 20 ft will consist of, from the surface:

73 inches of Plastic Clay with variable moisture content, based on season, 73 to 96 inches of uniform sand with variable moisture content, 96 to 180 inches of saturated uniform sand from the surface, and 180 to 240 inches saturated natural sand.

From Geological Survey data, the layers from 0 to 96 inches have an available water capacity of 0.15–0.2 inches per inch of depth. This indicates that the moisture content increases linearly with depth, until saturated soil, due to the ground water level is reached. Thermal resistivity is relatively constant for moist soils when the content exceeds 12%. Plastic Clay is the exception. In the South Houston area, soil moisture content is rarely lower than 12%, resulting in a vast simplification in the estimation of the thermal environment. The minimum moisture content occurs in August, and for Plastic Clay, this will be considered the worst case for cooling season operation of the ground tube.

This results in the following thermal resistances, 0 to 73 inches layer –0.8092 hr-ft-deg. F/BTU 73 to 180 inches layer –0.34102 hr-ft-deg. F/BTU 180 to 240 inches layer –0.3179 hr-ft-deg. F/BTU The final soil condition to be considered is that of temperature.

From Louisiana Cooperative Extension Service, the predicted soil temperatures for South Louisiana, treated as identical to South Texas, based on depth are available for review.

Heat dissipation through ground tubes is directly proportional to soil temperature. As average soil temperature increases, heat dissipation decreases. March through October is considered the "cooling season" in this area. August average ground temperature is considered worst case from the perspective of the ground source temperature.

Fluid dynamics including flow properties and associated film coefficients are the final property to be considered in the design and operation of the Ground Tube. If the flow through the annular and/or tubular areas exhibits a Reynolds number below about 2100, the flow is said to be laminar, also called streamline or viscous flow. In laminar flow, all particles of the fluid move in parallel paths in the direction of flow. The velocity of the stream at the center of the annular or tubular area is a maximum and it is zero at the pipe surface, the variation being parabolic during isothermal flow.

There are no component motions in a radial direction. If the fluid is being heated or cooled, the velocity distribution is no longer parabolic and some radial movement of the fluid occurs. Nevertheless, for laminar flow, the transfer of heat from fluid to pipe, or vice versa, is substantially by conduction through the thin surface film, which has little or no motion. If there are small rough projections on the inside surface of the pipe which extend into the moving stream, eddies will be formed when the fluid strikes the projections. This forces a portion of the fluid to move through the stagnant surface film and strike the wall. The particles of the fluid which strike the wall give up (or receive) energy and thus some heat is carried to (or from) the wall by convention. Eddies are caused also by any sort of obstruction in the line, such as valves and pipe bends, but it should be noted that the effect of these eddies in transferring heat by convection to or from the wall is limited and local, because the flow remains streamline outside of the region of the disturbance.

If the Reynolds number is greater than 3,000, the flow is said to be turbulent. In turbulent flow, there is a thin layer (several thousands of an inch thick) of fluid adjacent to the surface in laminar motion.

Next, there is a buffer layer, of the order of a few hundredths of an inch thick. The main body of fluid is turbulent, with particles moving in eddies, many with large component velocities in a radial direction. Thus, many particles, with component velocities toward the wall or surface, break through the laminar surface film and carry heat to or from the wall by convention. The heat convected to or from the wall in turbulent flow is very much larger than that conducted to or from the wall during laminar flow, so that, if rapid transfer of heat is desired, turbulent flow would in general be desired. There is an economic limit to which turbulence may be used to increase the rate of heat transfer. Frictional losses increase with the turbulence and the work of friction increases with the Reynolds number. At some point, the gain in heat-transmitting capacity is offset by the increased power for operation. This effect has been considered in the design by proper relative sizing on the inner and outer annular channels.

The Reynolds number is found through the equation.

$$Re = \frac{DeV\rho}{\mu}$$

Where De is the effective inside hydraulic diameter of the annular channel or tube, v is the velocity, ρ is the density, and μ is the viscosity.

The anticipated refrigerant temperatures entering the ground tube are 80–160 deg. F. Ground Tube Type embodiments of FIGS. 7, 8 and 9, identifies the dynamic flow environment for the Ground Tubes for various applications. The Reynolds number is above 3,000 in all cases, therefore the flow in both channels for all applications listed is expected to be turbulent.

For turbulent flow through a concentric annular channel, the film coefficient H for both the inner and outer annular channels of the tube are determined from:

$$Nu = 0.23 Re^{0.8} Pr^n$$

where n=0.4 for heating and 0.3 for cooling

The Reynolds number for tube A is found according to known methods. The Prandtl number is determined from the equation:

$$Pr = \left(\frac{c_p \mu}{k}\right)$$

Where cp is the specific heat, μ is the viscosity, and k is the thermal conductivity for the refrigerant based on known R-22 Thermophysical Properties.

The anticipated refrigerant temperatures entering the ground tube are 80°–160° F. Calculations were performed to profile Ground Tube A1–C1 Flow, identifying the dynamic flow environment for the Ground Tubes for various applications. The Reynolds number is above 3,000 in all cases, therefore the flow in both channels for all applications listed is expected to be turbulent.

The greatest limitation on the heat dissipation performance of the FIG. 7 embodiment is due to the thermal resistance imposed by the outside column of refrigerant. The next limitation is imposed by the thermal resistance of the soil. Film resistance of the inner and outer fluid interfaces rank lower. The tube itself provides a negligible resistance to heat dissipation. This conclusion is general and applies to all tube configurations and tonnages of air conditioners the tube are applied to.

The values of heat dissipation which occurs in each unit length of the Ground Tube are dependent on the media which the tube transverses as described in the environment section above. The relative temperature of the hot refrigerant is identified by the symbol $t_{ha}$. The cooled refrigerant is identified by the symbol $t_{ca}$, and the ground temperature is identified by the symbol $t_0$. $t_{ca}$ is treated as a constant across the water injection channel, as it is presumed that the heat dissipation provided by the water injection channel is a transient, with minimal contribution to the heat dissipation characteristics of the ground tube as duty cycle of the unit is increased.

The ground tube resembles a counter flow heat exchanger by the nature of its operation. As described earlier, the hot refrigerant enters the outside annular channel and returns via an inside annular channel in the case of the "A" configuration, and a tube in the case of a "B" or "C" configuration. Since the Ground Tube is counterflow, this means that in addition to the heat transfer occurring from the tube to the ground, there is also heat transfer between the two channels of refrigerant. In contrast to parallel flow, heat transfer takes place between the fluids at the moment when each is in its coldest state, and when each is in its hottest state. The transfer of heat in a counterflow exchanger tends to conserve available energy and can cause a higher final temperature of the fluid than what would be experienced with a parallel flow.

Since the counterflow tube is closed, maximum efficiency is achieved by maximizing the difference between $t_{ha}$ and $t_{ca}$. Insulating the inner channel would result in added complexities and cost for manufacturing, so controlling the flow nature in each channel is performed instead. Maximum Δta is achieved by maximizing turbulence in the outside channel and minimizing it in the inside channel. Careful consideration is required to prevent "flashing" of the refrigerant in the outside channel.

Figure 14:
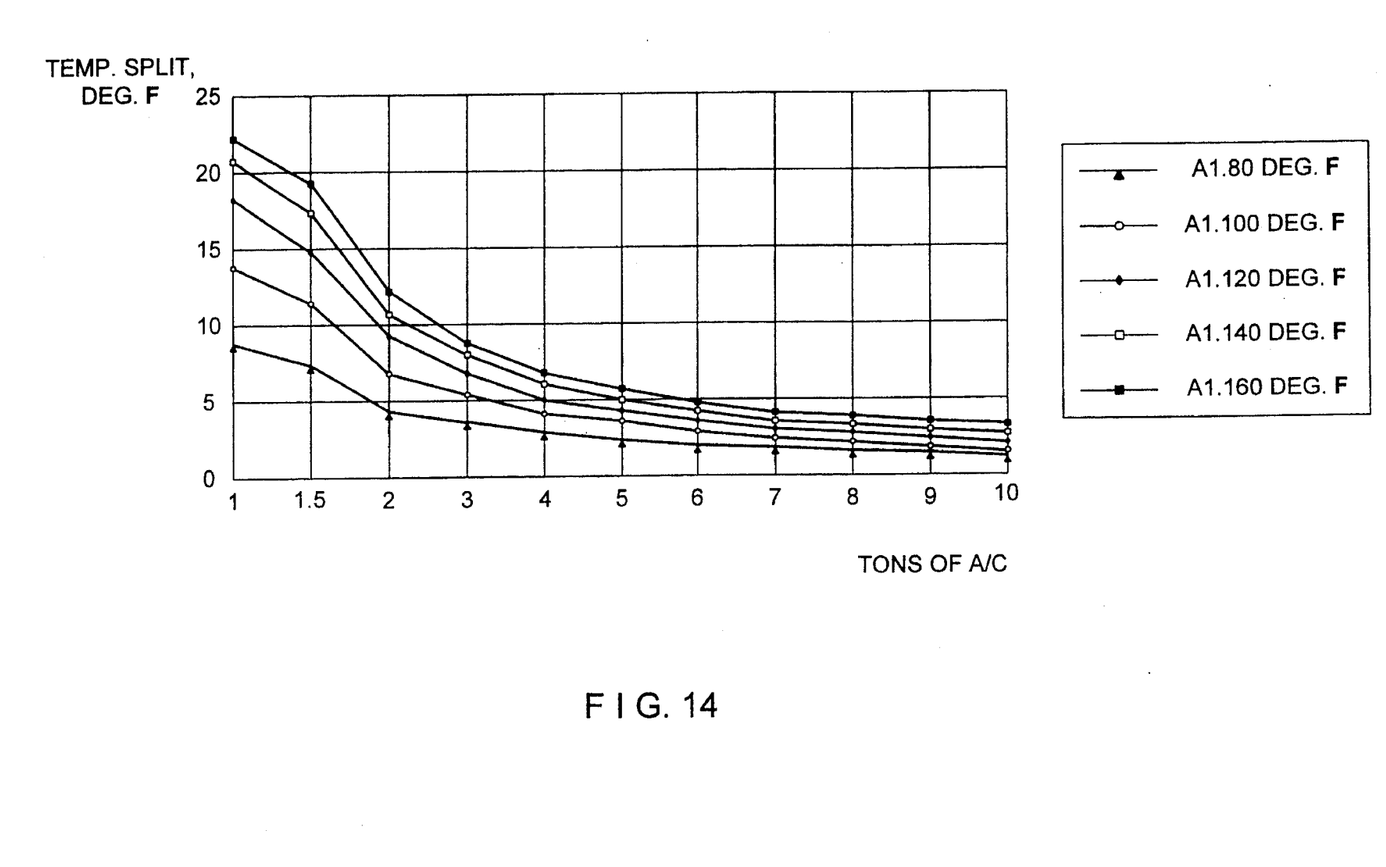
FIG. 14 is a graph showing expected temperature change for an A1 embodiment of the invention.

From the results, FIG. 7 embodiment appears to provide the greatest reduction in temperature for R-22 air conditioning application. FIG. 14, A1 Expected Temperature Change summarizes the A1 tube performance over the ranges of conditions considered. The conditions considered are:

Dry Ba soil

January ground temperatures

A/C tonnages from 1–10

Liquid line temperature 80°–160° F. in 20° increments

The application of this technology to an air conditioning system results in an increase in system performance. This performance increase is due to the limitations imposed by an air-cooled condenser. The condenser transfers the rejected heat to an available sink, in most cases the air. The difference between the condensing temperature and the available air dry-bulb temperature depend on the rate of air flow over the condenser and the rate of heat rejection. Rate of heat rejection is directly proportional to the outside ambient air temperature. As outside air temperature increases, the capacity for the air conditioning unit to reject heat decreases. Liquid line temperature increases and efficiency decreases. Outfitting the unit with a ground tube results in increasing the heat rejection, decreasing the liquid line temperature and increasing efficiency by reducing the amount of work input required.

The application of ground tubes are limited by the amount of pressure drop experienced with the larger tonnages. While pressure drop in liquid lines is not as critical as with suction and discharge lines, the pressure drop with the ground tube cannot be so excessive as to cause gas formation in the liquid line, insufficient liquid pressure at the liquid feed device, or both. Alternate installed multiple tube configurations in parallel and series arrangements of ground tubes are necessary based on the capacity of the unit. Determination of actual installation is based on a normally applied design limit, that is the pressure drop in the liquid line, due to friction, is not greater than that corresponding to about 2° F. 2° F. may be relaxed if it is determined that the planned installation will result in enough subcooling to offset potential gas formation in the lines.

DESIGN LIMITATIONS

The application of ground tubes are limited by the amount of pressure drop experienced with the larger tonnages. While pressure drop in liquid lines is not as critical as with suction and discharge lines, the pressure drop with the ground tube cannot be so excessive as to cause gas formation in the liquid line, insufficient liquid pressure at the liquid feed device, or both. Alternate tube configurations with larger annular cross sectional areas, as well as parallel and series arrangements of ground tubes are necessary based on the capacity of the unit. Determination of actual installation is based on a normally applied design limit, that is the pressure drop in the liquid line, due to friction, is not greater than that corresponding to about 2° F. 2° F. may be relaxed if it is determined that the planned installation will result in enough subcooling to offset potential gas formation in the lines.

INSTALLATION CONFIGURATION

Installations of multiple ground tubes is dictated by the temperature change and associated heat transfer characteristics shown in FIG. 14. FIG. 14 illustrates the limitation of a single Ground Tube when applied to a series of air conditioning units with increasing capacity. For example, referring to the figure, the expected temperature change for a 1.5 ton air conditioner with a 120° F. refrigerant temperature is 15°, but is only 5° for a 4 ton unit. This illustrates that the effectiveness of the tube in reducing the liquid line temperature before the evaporator drops off rapidly as the tube is applied to higher capacity units. Performance of the ground tube also drops off as the average temperature of the soil increases from winter and spring to summer. The ground is a relatively constant temperature, but the first ten feet of depth are subject to seasonal variation.

The A1 Ground Tube design geometry is the optimal design both from a cost and economic standpoint when the constraint of using standard size copper tubing to minimize material cost is considered. Specification of unique sizes of copper tubing would result in enhanced performance, but the cost for acquisition of custom size copper would result in slightly enhanced performance with no economic benefit. It is for these reasons that a multiple tube installation is required. Two options for the installation are available. That is serial, and parallel. The series arrangement of ground tube has been found to be the preferred mode with two ground tubes, preferably A1 ground tubes, connected in series for air conditioning tonnage of less than 5 tons and three ground tubes connected in series for greater than 5 tons of air conditioning tonnage.

Figure 12:
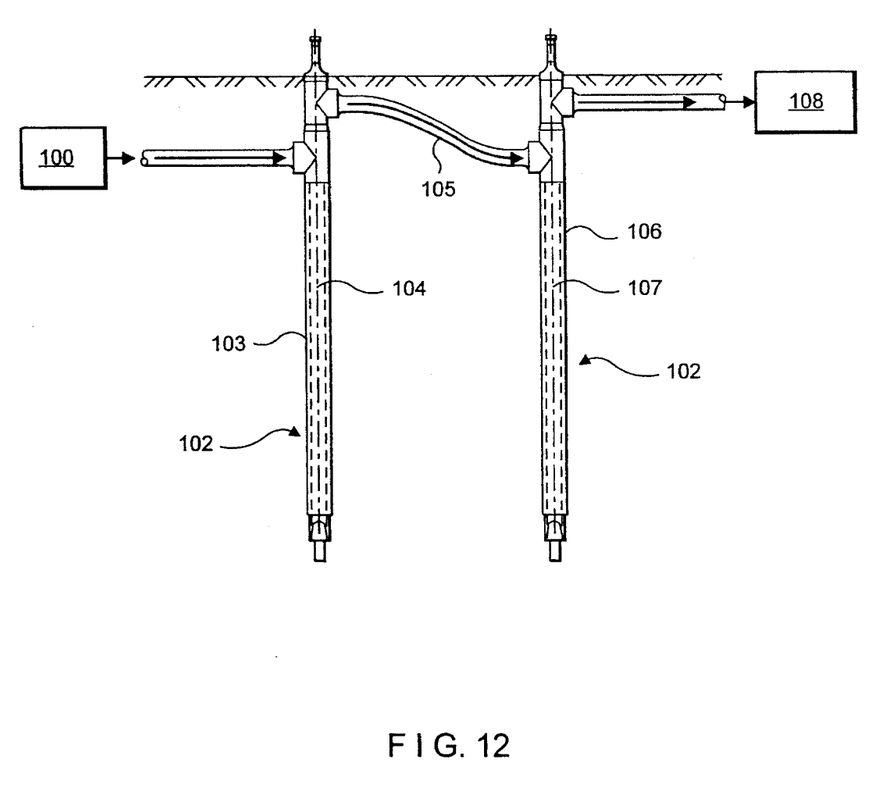
FIG. 12 is a side plan view showing a serial arrangement according to the invention.

A series arrangement of tubes shown in FIG. 12, is one where the refrigerant flows from the condenser 100 through the inlet pipe 103 of the first tube 101 into the outlet pipe 104, and then is directly channeled to a second tube 102 through an external manifold 105 and then back to the evaporator 108 by flowing through the inlet pipe 106 and outlet pipe of the second tube 102. Two tubes are shown, however, any number of serial tubes can be connected as long as the total pressure drop is constrained to the limits described above. The A1 tube design can have a modification to the upper geometry where the refrigerant supply and return "T"s and tubing have been rotated 180° in relation to each other to simplify the serial connection. Alternately, the "F" configuration of the supply and return "T"s and tubing can accommodate the serial connection with additional length and complexity of the connecting manifold.

A series arrangement of tubes yields, in relation to the single tube performance, a temperature drop slightly less than two times the performance of the single tube. This is due to the fact that the temperature reduction which occurs through the operation of the first tube results in a lower inlet temperature into the second tube. This reduction results in a lower difference in temperature between the inlet temperature of the second tube and the ground resulting in a corresponding reduction in heat dissipation capacity of the second tube, compared to that achievable with the first tube in series.

Figure 13:
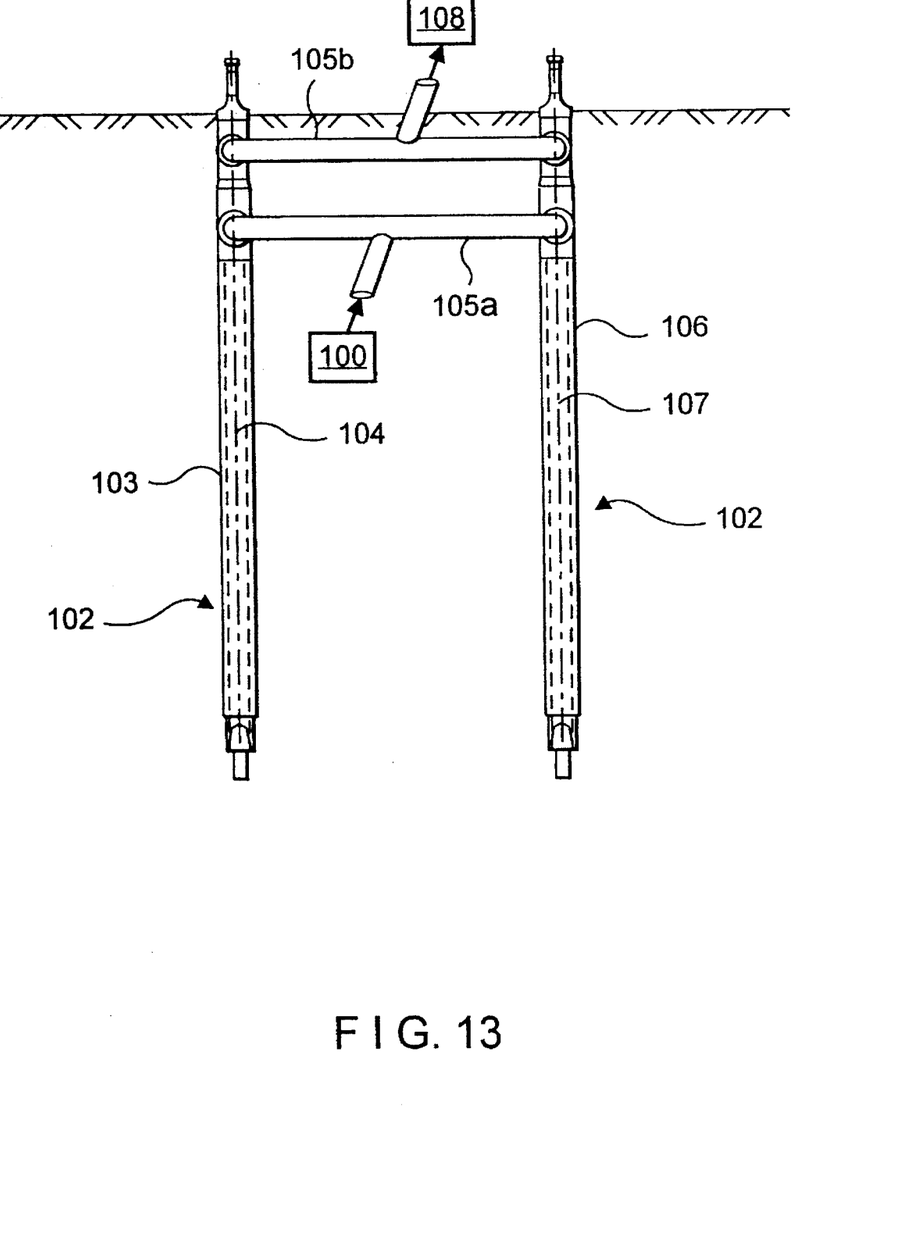
FIG. 13 is a side plan view showing a parallel arrangement according to the invention.

A parallel arrangement of tubes, shown in FIG. 13, is one in which an external maniford 105a, 105b is used to split the refrigerant flow from the condenser 100 equally between multiple tubes by maniford 105a, then fed into inlet pipes 103, 106, and then recombined from the outlet pipes 104, 107 into a single flow via maniford 105b before being returned to the evaporator 108. Two tubes are shown, however any number of parallel tubes can be connected as long as the total pressure drop is constrained to the limits described above. The "F" configuration of the supply and return "T" and associated maniford are shown. Alternately, the modification to the upper geometry where the refrigerant supply and return "T"s and tubing have been rotated 180° in relation to each other may be used to simplify the parallel connection.

A parallel arrangement of tubes yields, in relation to the single tube performance shown in FIG. 1, a temperature approximately slightly less than two times the performance of the single tube.

INSTALLATION

Figure 11:
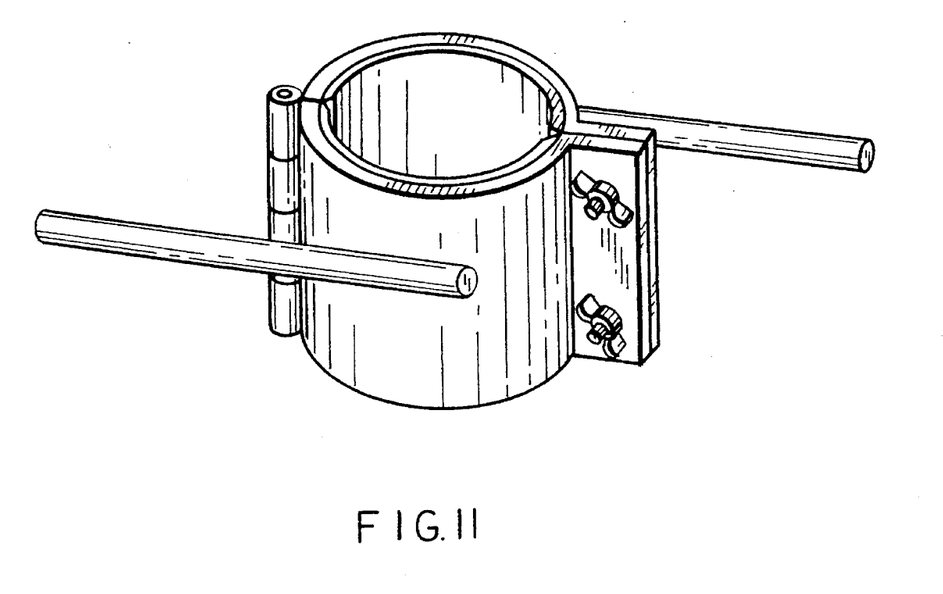
FIG. 11 is a view of a ground tube installation gripper which can be releasably attached to any one of the ground tube embodiments shown in FIGS. 1–9 into the ground.

As mentioned earlier, ground tubes are primarily injected using water. Pump size for the water injection is important, as increased pressure acts as a drill for the underground, compacted material. Flow rate is also important, as the water flow rate serves to wash the loosened material from the hole and deposit on the surface. Insertion of the tube involves alternate plunging and rotation of the tube to clear a channel for the deposition of loosened material on the surface. Resistance to the installation can be moderately high and layers of sandstone increase the required force for installation. In order to provide a stronger grip to the installer to aid him in applying the necessary force, a mechanism is temporarily attached to the ground tube. This mechanism, called a Ground Tube Installation Gripper is illustrated in FIG. 11, Ground Tube Installation Gripper. This Gripper is used as follows. A trench is dug and the A1 ground tubes are inserted and connected to a waterhose at the ground tubes water channel. The other end of the hose is connected to a power washer which supplies water to the house. The ground tubes, preferably A1 ground tubes, should be spaced 4 ft.–5 ft. apart, but 2 ft. apart is still all right. The ground then has a gripper placed over its tap portion. The gripper is twisted sideways, by its handles, and alternately up and down to drive and wedge the ground tube into the ground. The gripper is removed and the trench is recovered with the soil. After the tube sinks substantially into the ground, preferably 20 ft. into the ground, connection to the intake and outlet fittings of the ground tube are connected by welding and the gripper in unclasped from the ground tube and the trench is refilled to cover the portion of the ground tube that is above ground.

The ground tube is unique and provides for a more compact heat exchange than existing technologies including the DX ground coil. We do not limit ourselves to any particular details of construction set forth in this specification and illustrated in the accompanying drawings, as the same refers to and sets forth only certain embodiments of the invention, and it is observed that the same may be modified without departing from the spirit and scope of the claimed invention.

Having thus described the invention, what is claimed as new and desired to be secured by Letters Patent is as follows:

1. A system for providing ground source cooling for refrigerant coolants, comprising:

means for effecting heat exchange of a coolant from a refrigeration unit, said means including at least one tube disposed in an outside environment below ground level and surrounded by soil at a predetermined level so that soil at subsurface temperatures is in contact with at least a portion of said at least one tube, wherein said at least one tube is formed as a triple concentric pipe comprising an innermost pipe for acting as a water injection channel, a second pipe for acting as said refrigerant supply outlet pipe, said second pipe immediately surrounding said innermost pipe, and a third and outermost pipe for acting as said refrigerant supply inlet pipe, said third pipe immediately surrounding said second pipe.

2. A system according to claim 1, wherein said at least one tube is made of copper.

3. A system according to claim 1, wherein said at least one tube comprises a first tube and a second tube.

4. A system according to claim 3, wherein said first and second tubes are connected in series so that the refrigerant supply outlet pipe of said first tube is connected by a serial ground tube manifold to the refrigerant supply inlet pipe of said second tube.

5. A system according to claim 3, wherein said first and second tubes are connected in parallel by at least two parallel ground tube manifolds, a first parallel ground tube manifold connecting together the refrigerant supply inlet pipe of said first tube to the refrigerant supply inlet pipe of said second tube, and a second parallel ground tube manifold connecting together the refrigerant supply outlet pipe of said first tube to the refrigerant supply outlet pipe of said second tube.

6. A system according to claim 1, wherein said at least one tube are three tubes.

7. A system according to claim 6, wherein said three tubes are connected in series.

8. A system according to claim 7, wherein said three tubes are connected in parallel.

9. A system according to claim 1, wherein said at least one tube includes a water injection quick disconnect fitting for mounting to said water injection line channel.

10. A method of installing a ground source cooling for refrigerant coolants, the steps comprising:

digging a trench for planting at least one tube into a ground, said at least tube including a refrigerant supply inlet and a refrigerant supply outlet for supplying and returning coolant from and to a refrigeration unit;

connecting a water hose, one end of which is connected to a water pumping service such as a power washer, and another end of said hose being connected to a water injection channel of said at least one tube so that the water rushing into said channel can sink said at least a tube into the ground;

releasably securing a gripper mechanism having handles on both sides around a top portion of said at least one tube to rotate said gripper mechanism to drive said at least one tube into the ground approximately 20 ft. below surface;

removing said gripper and welding said inlet and said outlet of said at least one tube; and filling said trench to cover said at least one tube.

11. A method according to claim 10, wherein said at least one tube are two tubes connected in series.

12. A method according to claim 11, wherein said two tubes are connected in series and are A1 tubes.

13. A method according to claim 11, wherein said two tubes are spaced about 4 to 5 feet apart.

14. A method according to claim 10, wherein said tubes are three A1 tubes.

15. A method according to claim 14, wherein said three tubes are spaced about 4 to 5 feet apart.

16. A method according to claim 10, wherein said at least one tube are two A1 tubes connected in parallel.

17. A method according to claim 10, wherein said at least one tube are three A1 tubes connected in parallel.

* * * * *